United States Patent
He et al.

(10) Patent No.: US 9,215,743 B2
(45) Date of Patent: Dec. 15, 2015

(54) METHOD AND APPARATUS FOR CONTROLLING CHANNEL TRANSMISSION STATUS

(71) Applicant: Huawei Technologies Co., LTD, Shenzhen (CN)

(72) Inventors: Chuanfeng He, Beijing (CN); Bingzhao Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 270 days.

(21) Appl. No.: 13/888,786

(22) Filed: May 7, 2013

(65) Prior Publication Data
US 2013/0242839 A1    Sep. 19, 2013

Related U.S. Application Data

(63) Continuation of application No. PCT/CN2011/081462, filed on Oct. 28, 2011.

(30) Foreign Application Priority Data

Nov. 8, 2010    (CN) .......................... 2010 1 0548615

(51) Int. Cl.
    H04W 76/04    (2009.01)
    H04L 5/00    (2006.01)
(52) U.S. Cl.
    CPC ........... *H04W 76/048* (2013.01); *H04L 5/0098* (2013.01)
(58) Field of Classification Search
    USPC ........... 370/241, 252, 311, 328–329; 455/450
    See application file for complete search history.

(56) References Cited

U.S. PATENT DOCUMENTS

| | | | |
|---|---|---|---|
| 2006/0293043 A1* | 12/2006 | Aoyama | 455/422.1 |
| 2008/0132230 A1 | 6/2008 | Marinier et al. | |
| 2009/0296643 A1 | 12/2009 | Cave et al. | |
| 2009/0316575 A1 | 12/2009 | Gholmieh et al. | |
| 2010/0074188 A1* | 3/2010 | Hsu | 370/329 |
| 2010/0118723 A1* | 5/2010 | Pani et al. | 370/252 |
| 2010/0130219 A1* | 5/2010 | Cave et al. | 455/450 |
| 2010/0220606 A1* | 9/2010 | Niwano | 370/252 |
| 2010/0278130 A1* | 11/2010 | Sambhwani et al. | 370/329 |
| 2011/0026475 A1* | 2/2011 | Lee et al. | 370/329 |

(Continued)

FOREIGN PATENT DOCUMENTS

| | | |
|---|---|---|
| CN | 1317178 A | 10/2001 |
| CN | 101543120 A | 9/2009 |

(Continued)

OTHER PUBLICATIONS

Notice of Reasons for Rejection received in Application No. 2013-536990 mailed Apr. 1, 2014, 7 pages. (Partial Translation).

(Continued)

*Primary Examiner* — Edan Orgad
*Assistant Examiner* — Steven Willmore
(74) *Attorney, Agent, or Firm* — Slater & Matsil, L.L.P.

(57) ABSTRACT

A method and an apparatus for controlling a channel transmission status, can be used in the communication field. The method includes receiving a command for controlling activation of a secondary carrier. Within a preset delay time after the secondary carrier is activated, a channel transmission status corresponding to the secondary carrier to a continuous transmission status can be set.

23 Claims, 4 Drawing Sheets

(56) References Cited

U.S. PATENT DOCUMENTS

| | | | |
|---|---|---|---|
| 2011/0159903 A1* | 6/2011 | Yuk et al. | 455/507 |
| 2011/0170420 A1* | 7/2011 | Xi et al. | 370/241 |
| 2011/0211571 A1* | 9/2011 | Ryu et al. | 370/350 |
| 2011/0261704 A1* | 10/2011 | Etemad | 370/252 |
| 2012/0099463 A1* | 4/2012 | Saito et al. | 370/252 |
| 2012/0140689 A1* | 6/2012 | Pelletier et al. | 370/311 |

FOREIGN PATENT DOCUMENTS

| | | | |
|---|---|---|---|
| CN | 101547477 A | 9/2009 | |
| CN | 101600245 A | 12/2009 | |
| CN | 101616450 A | 12/2009 | |
| CN | 201541255 U | 8/2010 | |
| CN | 101827426 A | 9/2010 | |
| CN | 102137509 A | 7/2011 | |
| JP | 20110519539 A | 7/2011 | |
| WO | 2009132290 A2 | 10/2009 | |
| WO | WO 2009/155861 A1 | 12/2009 | |
| WO | WO 2010/085912 A1 | 8/2010 | |

OTHER PUBLICATIONS

ETSI TS 125 214 v9.3.0 (Oct. 2010), Technical Specification, Universal Mobile Telecommunications System (UMTS); Physical Layer Procedures (FDD) (3GPP TS 25.214 version 9.3.0 Release Oct. 9, 2010, 100 pages.

Extended European Search Report received on Application No. 11839006.1-1854, Applicant: Huawei Technologies Co., Ltd., mailed Aug. 14, 2013, 10 pages.

3rd Generation Partnership Project; Technical Specification Group Radio Access Netowrk; Physical layer procedures (FDD) (Release 9), 3GPP TS 25.214 V9.3.0, Sep. 2010, 98 pages.

3rd Generation Partnership Project; Technical Specification Group Radio Access Network; Physical layer procedures (FDD) (Release 10), 3GPP TS 25.214 V10.0.0, Sep. 2010, 99 pages.

Written Opinion of the International Searching Authority, received in Application No. PCT/CN2011/081462, mailed Feb. 9, 2012, 6 pages.

International Search Report received in Application No. PCT/CN2011/081462, mailed Feb. 9, 2012, 12 pages.

Second Office Action of Chinese Application No. 201010548615.X mailed Dec. 28, 2012, 21 pages. (Partial Translation).

Search Report received in Application No. 201010548615.X mailed Jun. 28, 2012, 2 pages.

Chinese Search Report of Chinese Application No. 201010548615.X mailed Feb. 14, 2012, 16 pages.

First Chinese Office Action of Chinese Application No. 201010548615.X mailed Jul. 6, 2012, 17 pages.

\* cited by examiner

METHOD AND APPARATUS FOR CONTROLLING CHANNEL TRANSMISSION STATUS

CROSS-REFERENCE TO RELATED APPLICATIONS

This application is a continuation of International Application No. PCT/CN2011/081462, filed on Oct. 28, 2011, which claims priority to Chinese Patent Application No. 201010548615.X, filed on Nov. 8, 2010, both of which are hereby incorporated by reference in their entireties.

TECHNICAL FIELD

The present invention relates to the communication field, and in particular, to a method and an apparatus for controlling a channel transmission status.

BACKGROUND

With the rapid development of communication technologies, a WCDMA (wideband code division multiple access) technology is widely researched and applied. To reduce interference and save power, DTX (discontinuous transmission) and DRX (discontinuous reception) features are introduced into the WCDMA technology. When DTX and DRX are in an activated status, a corresponding channel transmission status is discontinuous, and when the DTX and DRX are in a deactivated status, a corresponding channel transmission status is continuous. Therefore, a channel transmission status can be controlled by controlling a status of the DTX and a status of the DRX.

For a multi-carrier HSPA (high speed packet access) system, when control of the channel transmission status is implemented in the prior art, a status of DTX and a status of DRX of a secondary carrier always keeps consistent with that of a primary carrier, and in this case, a channel transmission status of the secondary carrier also keeps consistent with that of the primary carrier.

In the prior art, the status of the DTX and the status of the DRX of the secondary carrier always keeps consistent with that of the primary carrier, which results in low reliability of an initial channel synchronization process when the secondary carrier is activated.

SUMMARY OF THE INVENTION

To increase a speed and a success rate of synchronization when a secondary carrier is activated, thereby ensuring reliability of an initial synchronization process when the secondary carrier is activated, embodiments of the present invention provide a method and an apparatus for controlling a channel transmission status.

In one aspect, the present invention provides a method for controlling a channel transmission status, the method includes receiving a command for controlling activation of a secondary carrier. Within a preset delay time after the secondary carrier is activated, a channel transmission status is set corresponding to the secondary carrier to a continuous transmission status.

In another aspect, the present invention provides an apparatus for controlling a channel transmission status. The apparatus includes: a receiving module that is configured to receive a command for controlling activation of a secondary carrier. A controlling module is configured to set, within a preset delay time after the secondary carrier is activated, a channel transmission status corresponding to the secondary carrier to a continuous transmission status after the receiving module receives the command for controlling the activation of the secondary carrier.

According to the foregoing technical solutions, the speed and the success rate of the synchronization when the secondary carrier is activated can be increased, and reliability of an initial channel synchronization process when the secondary carrier is activated can be ensured.

BRIEF DESCRIPTION OF THE DRAWINGS

To illustrate the technical solutions in the embodiments of the present invention more clearly, accompanying drawings used in the description of the embodiments are briefly described in the following. Apparently, the accompanying drawings to be described are only some embodiments of the present invention, and persons of ordinary skill in the art can derive other drawings according to these accompanying drawings without creative efforts.

DETAILED DESCRIPTION OF ILLUSTRATIVE EMBODIMENTS

To make the objectives, technical solutions, and advantages of the present invention clearer, the following describes the embodiments of the present invention in detail with reference to the accompanying drawings.

In addition, the terms "system" and "network" here are usually used interchangeably. The term "and/or" here indicates only an association relationship for describing associated objects, and represents that three relationships may exist, for example, A and/or B may represent the following three cases: A exists separately, both A and B exist, and B exists separately. In addition, the character "/" here usually represents that former and latter objects associated are in an "or" relationship.

Figure 1:
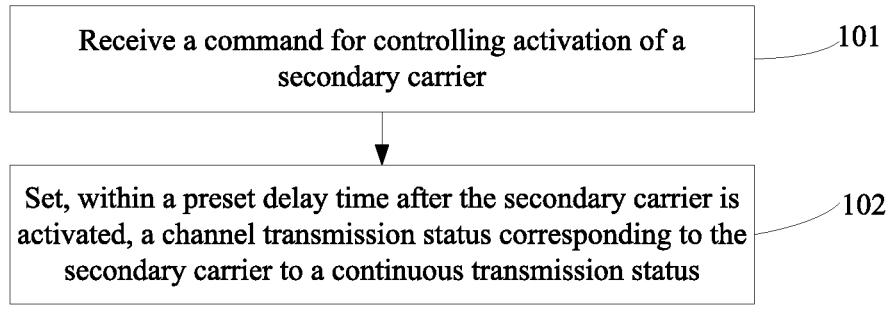
FIG. 1 is a flowchart of a method for controlling a channel transmission status according to an embodiment of the present invention.

FIG. 1 is a schematic flowchart of a method for controlling a channel transmission status according to an embodiment of the present invention, where the method may be described as follows:

101: Receive a command for controlling activation of a secondary carrier.

For example, the command for controlling the activation of the secondary carrier may be transmitted by a network-side device to a user equipment through physical layer signaling, so that the activation of the secondary carrier is triggered after the user equipment receives the command.

102: Set, within a preset delay time after the secondary carrier is activated, a channel transmission status corresponding to the secondary carrier to a continuous transmission status.

In another embodiment of the present invention, after the channel transmission status corresponding to the secondary carrier is set, within the preset delay time after the secondary carrier is activated, to the continuous transmission status, the method further includes: after the preset delay time, updating the channel transmission status corresponding to the secondary carrier to a status same as a corresponding user equipment channel transmission status before the secondary carrier is activated.

The method provided in the embodiment may implement control of the channel transmission status by setting a variable, and specific implementation manners include but are not limited to the following three manners.

A first implementation manner setting an independent user equipment discontinuous transmission and discontinuous reception enabled variable UE_DTX_DRX_Enabled for a primary carrier and the secondary carrier separately, setting, within the preset delay time after the secondary carrier is activated, a status of UE_DTX_DRX_Enabled corresponding to the secondary carrier to a deactivated status, and setting the channel transmission status corresponding to the secondary carrier according to the status of UE_DTX_DRX_Enabled corresponding to the secondary carrier, or, setting an independent uplink discontinuous transmission activated variable UL_DTX_Active for a primary carrier and the secondary carrier separately, setting, within the preset delay time after the secondary carrier is activated, a status of UL_DTX_Active corresponding to the secondary carrier to a deactivated status, and setting the channel transmission status corresponding to the secondary carrier according to the status of UL_DTX_Active corresponding to the secondary carrier.

In another embodiment of the present invention, after the setting, within the preset delay time after the secondary carrier is activated, the status of UE_DTX_DRX_Enabled corresponding to the secondary carrier to the deactivated status, and the setting the channel transmission status corresponding to the secondary carrier according to the status of UE_DTX_DRX_Enabled corresponding to the secondary carrier, the method further includes: after the preset delay time, updating the status of UE_DTX_DRX_Enabled corresponding to the secondary carrier to a status same as a status of UE_DTX_DRX_Enabled currently corresponding to the primary carrier, and updating the channel transmission status corresponding to the secondary carrier according to an updated status of UE_DTX_DRX_Enabled corresponding to the secondary carrier.

After the setting, within the preset delay time after the secondary carrier is activated, the status of UL_DTX_Active corresponding to the secondary carrier to the deactivated status, and the setting the channel transmission status corresponding to the secondary carrier according to the status of UL_DTX_Active corresponding to the secondary carrier, the method further includes: after the preset delay time, updating the status of UL_DTX_Active corresponding to the secondary carrier to a status same as a status of UL_DTX_Active currently corresponding to the primary carrier, and updating the channel transmission status corresponding to the secondary carrier according to an updated status of UL_DTX_Active corresponding to the secondary carrier.

A second implementation manner the setting, within the preset delay time after the secondary carrier is activated, the channel transmission status corresponding to the secondary carrier to the continuous transmission status, which specifically includes: setting a common user equipment discontinuous transmission and discontinuous reception enabled variable UE_DTX_DRX_Enabled for a primary carrier and the secondary carrier, setting, within the preset delay time after the secondary carrier is activated, a status of the common UE_DTX_DRX_Enabled to a deactivated status, and setting the channel transmission status corresponding to the secondary carrier according to the status of the common UE_DTX_DRX_Enabled.

In another embodiment of the present invention, the setting, within the preset delay time after the secondary carrier is activated, the channel transmission status corresponding to the secondary carrier to the continuous transmission status specifically includes: setting a common uplink discontinuous transmission activated variable UL_DTX_Active for a primary carrier and the secondary carrier, setting, within the preset delay time after the secondary carrier is activated, a status of the common UL_DTX_Active to a deactivated status, and setting the channel transmission status corresponding to the secondary carrier according to the status of the common UL_DTX_Active.

In another embodiment of the present invention, after the setting, within the preset delay time after the secondary carrier is activated, the status of the common UE_DTX_DRX_Enabled to the deactivated status, and the setting the channel transmission status corresponding to the secondary carrier according to the status of the common UE_DTX_DRX_Enabled, the method further includes: after the preset delay time, updating the status of the common UE_DTX_DRX_Enabled to a status same as a status of corresponding UE_DTX_DRX_Enabled before the secondary carrier is activated, and updating the channel transmission status corresponding to the secondary carrier according to an updated status of the common UE_DTX_DRX_Enabled.

In another embodiment of the present invention, after the setting, within the preset delay time after the secondary carrier is activated, the status of the common UL_DTX_Active to the deactivated status, and the setting the channel transmission status corresponding to the secondary carrier according to the status of the common UL_DTX_Active, the method further includes: after the preset delay time, updating the status of the common UL_DTX_Active to a status same as a status of corresponding UL_DTX_Active before the secondary carrier is activated, and updating the channel transmission status corresponding to the secondary carrier according to an updated status of the common UL_DTX_Active.

A third implementation manner setting a common user equipment discontinuous transmission and discontinuous reception enabled variable UE_DTX_DRX_Enabled and/or an uplink discontinuous transmission activated variable UL_DTX_Active for a primary carrier and the secondary carrier.

The channel transmission status corresponding to the secondary carrier is set, within the preset delay time after the secondary carrier is activated, to the continuous transmission status, and the status of the common UE_DTX_DRX_Enabled and/or UL_DTX_Active is irrelevant to the channel transmission status corresponding to the secondary carrier.

In another embodiment of the present invention, after the channel transmission status corresponding to the secondary carrier is set, within the preset delay time after the secondary carrier is activated, to the continuous transmission status, the method further includes: after the preset delay time, updating the channel transmission status corresponding to the secondary carrier according to the status of the common UE_DTX_DRX_Enabled and/or UL_DTX_Active.

The preset delay time is equal to a value of an enabling delay in a discontinuous transmission and discontinuous reception parameter, or is a value of an enabling delay separately set by a network side for the secondary carrier, or is a preset fixed delay value.

A detailed description is given in the following with reference to the following specific embodiments.

Figure 2:
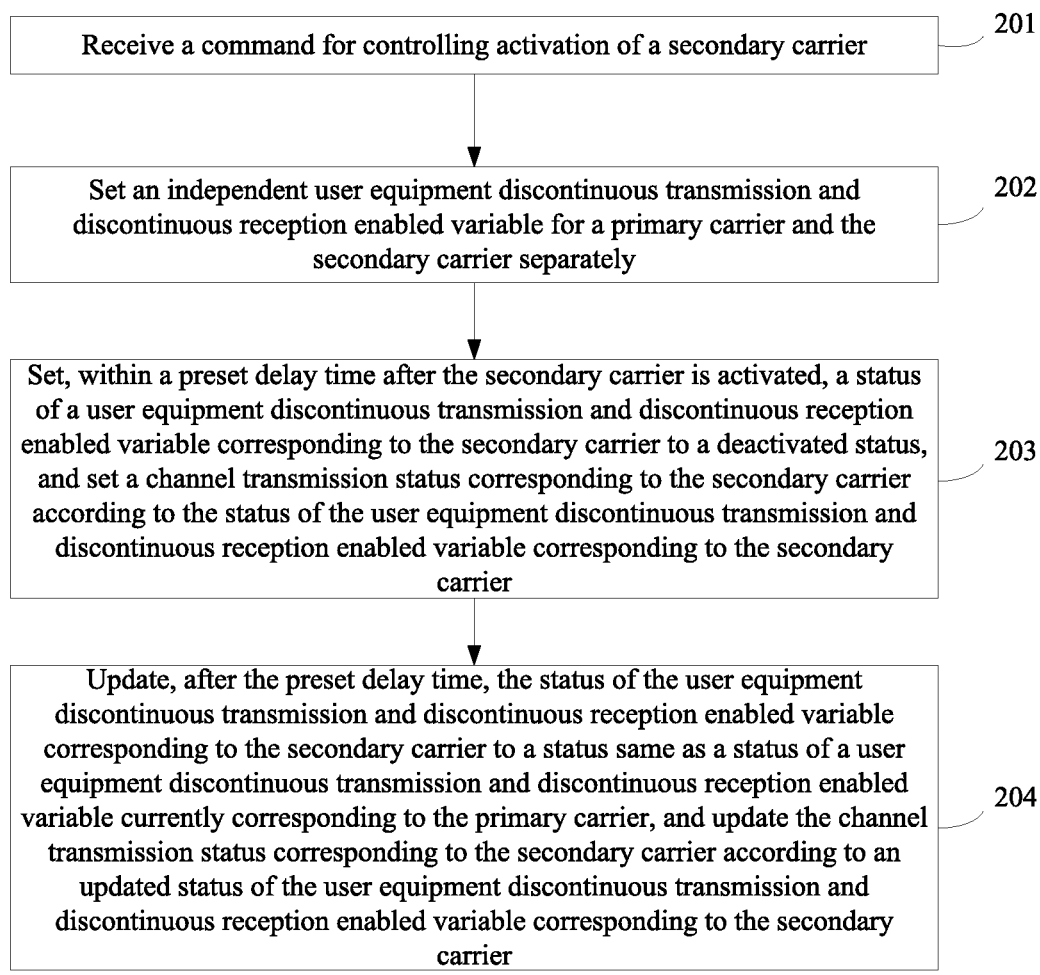
FIG. 2 is a flowchart of a method for controlling a channel transmission status according to another embodiment of the present invention.

In view of a case that the channel transmission status of the secondary carrier keeps consistent with that of the primary carrier in the prior art, and in order to improve a problem in the prior art, a method provided in another embodiment of the present invention uses a manner different from the prior art: setting an independent user equipment discontinuous transmission and discontinuous reception enabled variable for a primary carrier and a secondary carrier separately, so that a channel transmission status after the secondary carrier is activated does not need to be affected by the primary carrier, thereby ensuring reliability of an initial channel synchronization process when the secondary carrier is activated. FIG. 2 is a schematic flowchart of a method for controlling a channel transmission status according to another embodiment of the present invention.

201: Receive a command for controlling activation of a secondary carrier.

For this step, the command for controlling the activation of the secondary carrier is not specifically limited in this embodiment. In actual applications, the command for controlling the activation of the secondary carrier may be transmitted by a network-side device to a user equipment through physical layer signaling, so that the activation of the secondary carrier is triggered after the user equipment receives the command.

202: Set an independent user equipment discontinuous transmission and discontinuous reception enabled variable for a primary carrier and the secondary carrier separately.

For example, the user equipment discontinuous transmission and discontinuous reception enabled variable is used to represent an enabled status of DTX and an enabled status of DRX of the user equipment, namely, UE_DTX_DRX_Enabled. When a status of the variable is a activated status, UE_DTX_DRX_Enabled=true, and the DTX and DRX of the user equipment may be activated, that is, the user equipment may be in a channel transmission status of discontinuous transmission and discontinuous reception; when a status of the variable is a deactivated status, UE_DTX_DRX_Enabled=false, and the DTX and DRX of the user equipment are deactivated, that is, the user equipment is in a channel transmission status of continuous transmission and continuous reception.

According to the status of UE_DTX_DRX_Enabled, if UE_DTX_DRX_Enabled=true, and the DTX of the user equipment is activated, a value of UL_DTX_Active is true; if UE_DTX_DRX_Enabled=false, and the DTX of the user equipment is deactivated, a value of UL_DTX_Active is false.

In addition, no matter whether the value of UE_DTX_DRX_Enabled is true or false, the value takes effect only when the user equipment can use features of DTX and DRX. Whether the user equipment can use the features of the DTX and DRX needs to be judged according to whether a value of a discontinuous transmission and discontinuous reception status variable DTX_DRX_STATUS set by a high-layer network-side device is true or false. To set the value of DTX_DRX_STATUS to true, the following conditions need to be met. The user equipment is in a CELL_DCH (Enhanced Dedicated Channel, cell dedicated channel status) status, values of variables HS_DSCH RECEPTION (High Speed Downlink Shared Channel, channel reception) and E_DCH_TRANSMISSION (enhanced dedicated channel transmission) are TRUE, an uplink is not configured with a DPDCH (Dedicated Physical Data Channel) and a downlink is configured with an F-DPCH (Fractional Dedicated Physical Channel), a variable DTX_DRX_PARAMS (discontinuous transmission and discontinuous reception parameter) is set, and a received message includes a "DTX-DRX timing information (discontinuous transmission and discontinuous reception timing information) information element.

The foregoing conditions may be carried in an RRC (Radio Resource Control) connection setup message, an active set update message, a cell update confirmation message, or any reconfiguration message. The user equipment may determine whether the value of DTX_DRX_STATUS is true or false by receiving any one of the messages.

203: Set, within a preset delay time after the secondary carrier is activated, a status of a user equipment discontinuous transmission and discontinuous reception enabled variable corresponding to the secondary carrier to a deactivated status, and set a channel transmission status corresponding to the secondary carrier according to the status of the user equipment discontinuous transmission and discontinuous reception enabled variable corresponding to the secondary carrier.

For this step, a value of the preset delay time is not limited in this embodiment. In actual applications, an enabling delay parameter Enabling_Delay is set in the foregoing DTX_DRX_PARAMS, and a value of Enabling_Delay may be used as the value of the preset delay time. Alternatively, a network side may also separately set a delay parameter Enabling_Delay for the secondary carrier, and a value of the enabling delay parameter separately set by the network side for the secondary carrier is used as the value of the preset delay time. Alternatively, a fixed delay value may also be preset, and the preset fixed delay value is used as the value of the preset delay time.

Because the status of the user equipment discontinuous transmission and discontinuous reception enabled variable corresponding to the secondary carrier is set, within the preset delay time after the secondary carrier is activated, to the deactivated status, that is, UE_DTX_DRX_Enabled=false, and the DTX of the user equipment is deactivated, the user equipment is in a continuous transmission status, and can receive enough channel signals to judge channel quality, thereby ensuring a speed and a success rate of synchronization.

In another embodiment of the present invention, in order to achieve a purpose of saving power, after synchronization is ensured according to the foregoing steps 201 to 203, the method further includes a step of updating the status of UE_DTX_DRX_Enabled corresponding to the secondary carrier. For details, reference may be made to the following step 204.

204: Update, after the preset delay time, the status of the user equipment discontinuous transmission and discontinuous reception enabled variable corresponding to the secondary carrier to a status same as a status of a user equipment discontinuous transmission and discontinuous reception enabled variable currently corresponding to the primary carrier, and update the channel transmission status corresponding to the secondary carrier according to an updated status of the user equipment discontinuous transmission and discontinuous reception enabled variable corresponding to the secondary carrier.

Statuses of UE_DTX_DRX_Enabled and UL_DTX_Active that currently correspond to the primary carrier are not limited in this embodiment. According to the updated status of UE_DTX_DRX_Enabled of the secondary carrier, statuses of UL_DTX_Active and DL_DRX_Active that correspond to the secondary carrier are also updated to statuses same as the statuses of UL_DTX_Active and DL_DRX_Active that currently correspond to the primary carrier.

In another embodiment of the present invention, an independent uplink discontinuous transmission activated UL_DTX_Active variable may also be set for the primary carrier and the secondary carrier separately; a status of UL_DTX_Active corresponding to the secondary carrier is set, within the preset delay time after the secondary carrier is activated, to a deactivated status, and the channel transmission status corresponding to the secondary carrier is set according to the status of UL_DTX_Active corresponding to the secondary carrier no matter whether the status of UE_DTX_DRX_Enabled corresponding to the secondary carrier is activated or not. Therefore, in addition to implementing setting the channel transmission status corresponding to the secondary carrier to the continuous transmission status through the manner, "setting, within the preset delay time after the secondary carrier is activated, the status of UE_DTX_DRX_Enabled corresponding to the secondary carrier to the deactivated status, and setting the channel transmission status corresponding to the secondary carrier according to the status of UE_DTX_DRX_Enabled corresponding to the secondary carrier", provided in the foregoing step 203, the effect of setting the channel transmission status corresponding to the secondary carrier to the continuous transmission status may also be achieved by "setting, within the preset delay time after the secondary carrier is activated, the status of UL_DTX_Active to the deactivated status, and setting the channel transmission status corresponding to the secondary carrier according to the status of UL_DTX_Active no matter whether the status of UE_DTX_DRX_Enabled corresponding to the secondary carrier is activated or not". Which manner is specifically adopted for implementation is not specifically limited here.

For a case that independent UL_DTX_Active is set for the primary carrier and the secondary carrier separately, in another embodiment of the present invention, the effect of updating the channel transmission status corresponding to the secondary carrier may also be achieved by "updating, after the preset delay time, the status of UL_DTX_Active corresponding to the secondary carrier to a status same as a status of UL_DTX_Active currently corresponding to the primary carrier, and updating the channel transmission status corresponding to the secondary carrier according to an updated status of UL_DTX_Active corresponding to the secondary carrier". Which manner is specifically adopted for implementation is not specifically limited in this embodiment.

It should be noted that, the control of the channel transmission status is described in detail by only taking a multi-carrier HSPA system as an example. The method conception provided in this embodiment may be further applied to other multi-carrier systems such as WCDMA (Wideband Code Division Multiple Access, wideband code division multiple access) and LTE (Long Term Evolution, long term evolution). For example, for activation or deactivation through physical layer signaling in multi-carrier system design in an LTE system, based on the method conception provided in the embodiment of the present invention, an activated or a deactivated status of a certain carrier may also be represented according to features of a physical layer resource used for transmitting signaling. A principle is the same as the method provided in the embodiment, and is not repeatedly described here.

By using the method provided in the embodiment, the command for controlling the activation of the secondary carrier is received, and the channel transmission status corresponding to the secondary carrier is set, within the preset delay time after the secondary carrier is activated, to the continuous transmission status, so that when detection of receiving quality is performed within the preset delay time, the speed and the success rate of the synchronization when the secondary carrier is activated can be increased, and the reliability of the initial channel synchronization process when the secondary carrier is activated is ensured.

Figure 3:
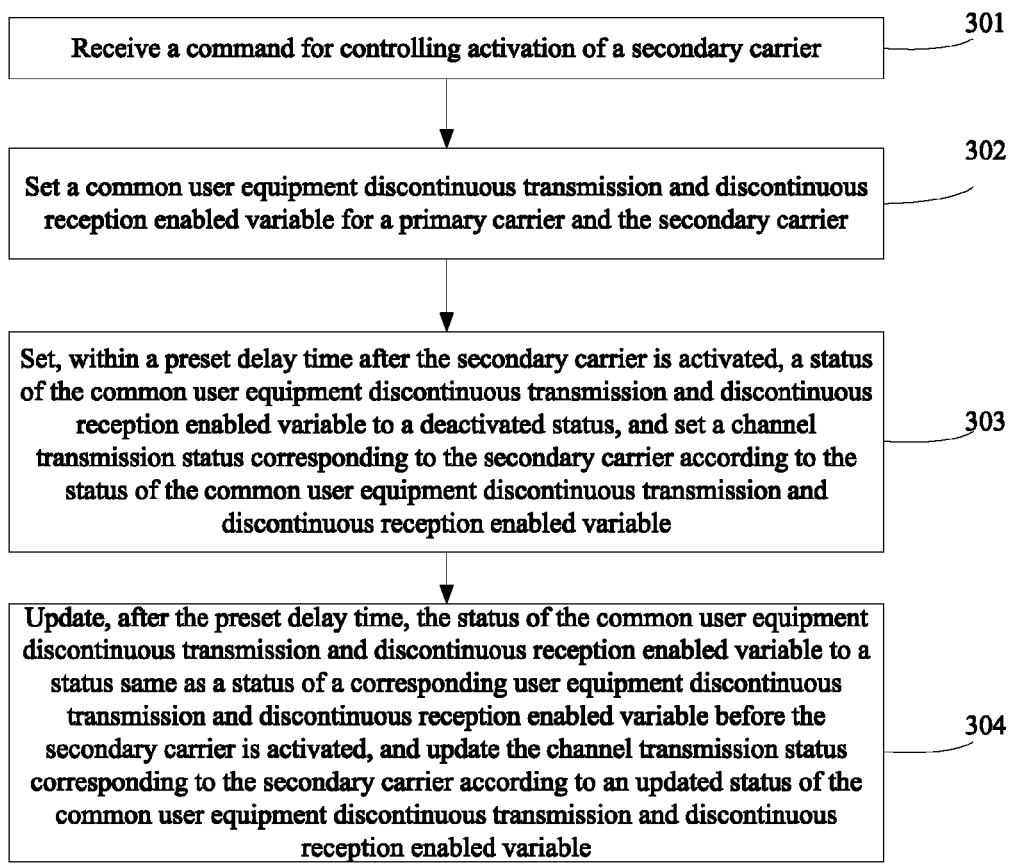
FIG. 3 is a flowchart of a method for controlling a channel transmission status according to another embodiment of the present invention.

To improve the problem in the prior art, on the basis of setting a common user equipment discontinuous transmission and discontinuous reception enabled variable for a primary carrier and a secondary carrier, in a method provided in another embodiment of the present invention, a channel transmission status of the secondary carrier is controlled independently within a preset delay time after the secondary carrier is activated, so that the secondary carrier does not need to be affected by the primary carrier within the preset delay time, thereby ensuring reliability of an initial channel synchronization process when the secondary carrier is activated. Referring to FIG. 3, a procedure of the method provided in another embodiment of the present invention is specifically described as follows.

301: Receive a command for controlling activation of a secondary carrier.

This step is the same as the foregoing step 201, the command for controlling the activation of the secondary carrier is also not specifically limited here.

302: Set a common user equipment discontinuous transmission and discontinuous reception enabled variable for a primary carrier and the secondary carrier.

For example, the user equipment discontinuous transmission and discontinuous reception enabled variable is also used to represent an enabled status of DTX and an enabled status of DRX of a user equipment, namely, UE_DTX_DRX_Enabled. When the variable UE_DTX_DRX_Enabled=true, the DTX and DRX of the user equipment are activated, that is, the user equipment may be in a channel transmission status of discontinuous transmission and discontinuous reception; when the variable UE_DTX_DRX_Enabled=false, the DTX and DRX of the user equipment are deactivated, that is, the user equipment is in a channel transmission status of continuous transmission and continuous reception.

For the description of relevant content of UL_DTX_Active, reference may be made to the description of the foregoing step 202, and details are not repeatedly described here.

303: Set, within a preset delay time after the secondary carrier is activated, a status of the common user equipment discontinuous transmission and discontinuous reception enabled variable to a deactivated status, and set a channel transmission status corresponding to the secondary carrier according to the status of the common user equipment discontinuous transmission and discontinuous reception enabled variable.

For example, even if the common UE_DTX_DRX_Enabled is set for the primary carrier and the secondary carrier in the foregoing step 302, in order to ensure reliability of an initial channel synchronization process when the secondary carrier is activated, in this embodiment, a manner of independently controlling, within the preset delay time after the secondary carrier is activated, the channel transmission status of the secondary carrier is adopted in this step, so that the secondary carrier does not need to be affected by the primary carrier within the preset delay time.

In this embodiment, a value of the preset delay time is also not limited, which is the same as the relevant description in the foregoing step 203.

Because the status of UE_DTX_DRX_Enabled corresponding to the secondary carrier is set, within the preset delay time after the secondary carrier is activated, to the deactivated status, that is, UE_DTX_DRX_Enabled=false, and the DTX and DRX of the user equipment are deactivated, the user equipment is in the channel transmission status of continuous transmission and continuous reception, and can receive enough channel signals to judge channel quality, thereby ensuring a speed and a success rate of synchronization.

In another embodiment of the present invention, common UL_DTX_Active may also be set for the primary carrier and secondary carrier; a status of the common UL_DTX_Active is set, within the preset delay time after the secondary carrier is activated, to a deactivated status, and no matter whether the status of UE_DTX_DRX_Enabled corresponding to the secondary carrier is activated or not, the channel transmission status corresponding to the secondary carrier is set according to the status of UL_DTX_Active corresponding to the secondary carrier. Therefore, in addition to implementing setting the channel transmission status corresponding to the secondary carrier to the continuous transmission status through the step, "setting, within the preset delay time after the secondary carrier is activated, the status of the common UE_DTX_DRX_Enabled to the deactivated status, and setting the channel transmission status corresponding to the secondary carrier according to the status of the common UE_DTX_DRX_Enabled", the effect of setting the channel transmission status corresponding to the secondary carrier to the continuous transmission status may also be achieved by "setting, within the preset delay time after the secondary carrier is activated, the status of the common UL_DTX_Active to the deactivated status, and setting the channel transmission status corresponding to the secondary carrier according to the status of the common UL_DTX_Active no matter whether the status of UE_DTX_DRX_Enabled corresponding to the secondary carrier is activated or not". Which manner is specifically adopted for implementation is not specifically limited here.

In another embodiment of the present invention, in order to achieve a purpose of saving power, after synchronization is ensured, the method further includes a step of updating the status of the common UE_DTX_DRX_Enabled. For details, reference may be made to the following step 304.

304: Update, after the preset delay time, the status of the common user equipment discontinuous transmission and discontinuous reception enabled variable to a status same as a status of a corresponding user equipment discontinuous transmission and discontinuous reception enabled variable before the secondary carrier is activated, and update the channel transmission status corresponding to the secondary carrier according to an updated status of the common user equipment discontinuous transmission and discontinuous reception enabled variable.

For this step, because the set UE_DTX_DRX_Enabled is common to the primary carrier and the secondary carrier, the status of corresponding UE_DTX_DRX_Enabled before the secondary carrier is activated is the same as a status of UE_DTX_DRX_Enabled corresponding to the primary carrier before the secondary carrier is activated.

The status of corresponding UE_DTX_DRX_Enabled before the secondary carrier is activated is not limited here. The status of the UL_DTX_Active variable corresponding to the secondary carrier is also updated according to the updated status of UE_DTX_DRX_Enabled of the secondary carrier.

For a case that the common UL_DTX_Active is set for the primary carrier and the secondary carrier, in another embodiment of the present invention, the effect of updating the channel transmission status corresponding to the secondary carrier may also be achieved by "updating, after the preset delay time, the status of the common UL_DTX_Active to a status same as a status of corresponding UL_DTX_Active before the secondary carrier is activated, and updating the channel transmission status corresponding to the secondary carrier according to an updated status of the common UL_DTX_Active". Which manner is specifically adopted for implementation is not specifically limited here.

It should be noted that, the control of the channel transmission status is described in detail by only taking a multi-carrier HSPA system as an example. The method conception provided in this embodiment may also be applied to other multi-carrier systems such as WCDMA and LTE. For example, for activation or deactivation through physical layer signaling in multi-carrier system design in an LTE system, based on the method conception provided in the embodiment of the present invention, an activated or a deactivated status of a certain carrier may also be represented according to features of a physical layer resource used for transmitting signaling. A principle is the same as the method provided in the embodiment, and is not repeatedly described here.

By using the method provided in the embodiment, the command for controlling the activation of the secondary carrier is received, and the channel transmission status corresponding to the secondary carrier is set, within the preset delay time after the secondary carrier is activated, to the continuous transmission status, so that when detection of receiving quality is performed within the preset delay time, the speed and the success rate of the synchronization when the secondary carrier is activated can be increased, and the reliability of the initial channel synchronization process when the secondary carrier is activated is ensured.

Figure 4:
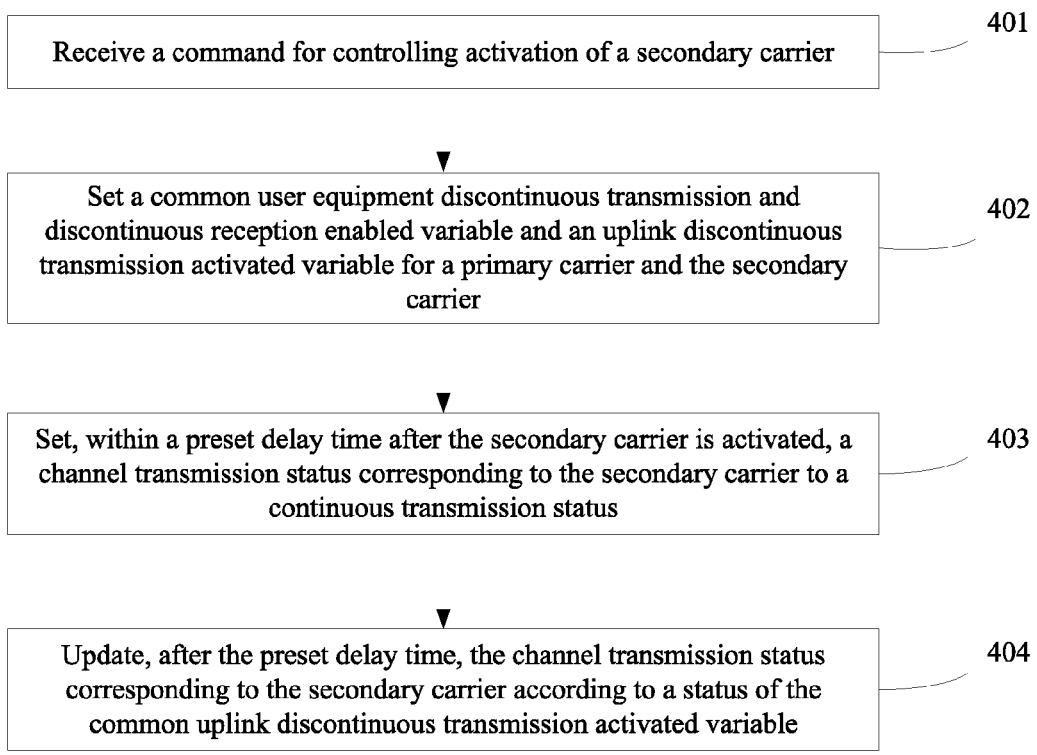
FIG. 4 is a flowchart of a method for controlling a channel transmission status according to another embodiment of the present invention.

To improve the problem in the prior art, on the basis of setting a common user equipment discontinuous transmission and discontinuous reception enabled variable for a primary carrier and a secondary carrier, in a method provided in another embodiment of the present invention, a channel transmission status of the secondary carrier is controlled independently within a preset delay time after the secondary carrier is activated, so that the secondary carrier does not need to be affected by the primary carrier within the preset delay time, thereby ensuring reliability of an initial channel synchronization process when the secondary carrier is activated. Referring to FIG. 4, a procedure of the method provided in another embodiment of the present invention is specifically described as follows.

401: Receive a command for controlling activation of a secondary carrier.

This step is the same as the foregoing step 201, the command for controlling the activation of the secondary carrier is also not specifically limited here.

402: Set a common user equipment discontinuous transmission and discontinuous reception enabled variable for a primary carrier and the secondary carrier.

The user equipment discontinuous transmission and discontinuous reception enabled variable is also used to represent an enabled status of DTX and an enabled status of DRX of a user equipment, namely, UE_DTX_DRX_Enabled.

When the variable UE_DTX_DRX_Enabled=true, the DTX and DRX of the user equipment are activated, that is, the user equipment may be in a channel transmission status of discontinuous transmission and discontinuous reception; when the variable UE_DTX_DRX_Enabled=false, the DTX and DRX of the user equipment are deactivated, that is, the user equipment is in a channel transmission status of continuous transmission and continuous reception.

For the description of relevant content of UL_DTX_Active, reference may be made to the description of the foregoing step 202, and details are not repeatedly described here.

403: Set, within a preset delay time after the secondary carrier is activated, a channel transmission status corresponding to the secondary carrier to a continuous transmission status.

For example, even if the common UE_DTX_DRX_Enabled is set for the secondary carrier and the primary carrier, when the channel transmission status corresponding to the secondary carrier is set to the continuous transmission status in this step, a status of the common UE_DTX_DRX_Enabled is irrelevant to the channel transmission status corresponding to the secondary carrier.

That is to say, in this step, control of a corresponding channel transmission status after the secondary carrier is activated is also implemented, but the control does not affect the status of the common UE_DTX_DRX_Enabled of the secondary carrier and the primary carrier, thereby not affecting a channel transmission status of the primary carrier.

In another embodiment of the present invention, in order to achieve a purpose of saving power, after synchronization is ensured, the method further includes a step of updating the channel transmission status corresponding to the secondary carrier. For details, reference may be made to the following step 404.

404: Update, after the preset delay time, the channel transmission status corresponding to the secondary carrier according to the status of the common user equipment discontinuous transmission and discontinuous reception enabled variable.

For this step, because the set UE_DTX_DRX_Enabled is common to the primary carrier and the secondary carrier, a status of corresponding UE_DTX_DRX_Enabled before the secondary carrier is activated is the same as a status of UE_DTX_DRX_Enabled corresponding to the primary carrier before the secondary carrier is activated.

The status of corresponding UE_DTX_DRX_Enabled before the secondary carrier is activated is not limited here. The channel transmission status corresponding to the secondary carrier may keep consistent with a channel transmission status corresponding to the primary carrier when the channel transmission status corresponding to the secondary carrier is updated according to an updated status of the common UE_DTX_DRX_Enabled.

In addition, in another embodiment of the present invention, a common UL_DTX_Active may also be set for the primary carrier and the secondary carrier; within the preset delay time after the secondary carrier is activated, no matter whether a status of UL_DTX_Active corresponding to the secondary carrier is activated or not, the channel transmission status corresponding to the secondary carrier is set to the continuous transmission status, that is, the channel transmission status corresponding to the secondary carrier is irrelevant to the status of the common UL_DTX_Active.

That is to say, even if control of a corresponding channel transmission status after the secondary carrier is activated is also implemented, but the control does not affect the status of the common UL_DTX_Active of the secondary carrier and the primary carrier, thereby not affecting the channel transmission status of the primary carrier.

After the preset delay time, the channel transmission status corresponding to the secondary carrier also needs to be updated. During specific updating, the channel transmission status corresponding to the secondary carrier may be updated according to the status of the common UL_DTX_Active.

It should be noted that, the control of the channel transmission status is described in detail by only taking a multi-carrier HSPA system as an example. The method conception provided in this embodiment may also be applied to other multi-carrier systems such as WCDMA and LTE. For example, for activation or deactivation through physical layer signaling in multi-carrier system design in an LTE system, based on the method conception provided in the embodiment of the present invention, an activated or a deactivated status of a certain carrier may also be represented according to features of a physical layer resource used for transmitting signaling. A principle is the same as the method provided in the embodiment, and is not repeatedly described here.

By using the method provided in the embodiment, the command for controlling the activation of the secondary carrier is received, and the channel transmission status corresponding to the secondary carrier is set, within the preset delay time after the secondary carrier is activated, to the continuous transmission status, so that when detection of receiving quality is performed within the preset delay time, the speed and the success rate of the synchronization when the secondary carrier is activated can be increased, and the reliability of the initial channel synchronization process when the secondary carrier is activated is ensured.

Figure 5:
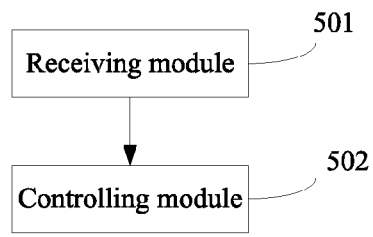
FIG. 5 is a schematic structural diagram of an apparatus for controlling a channel transmission status according to another embodiment of the present invention.

Another embodiment of the present invention provides an apparatus for controlling a channel transmission status, which may be configured to execute each step of the foregoing method embodiments. Referring to FIG. 5, the apparatus includes a receiving module 501 and a controlling module 502.

The receiving module 501 is configured to receive a command for controlling activation of a secondary carrier.

The controlling module 502 is configured to set, within a preset delay time after the secondary carrier is activated, a channel transmission status corresponding to the secondary carrier to a continuous transmission status after the receiving module 501 receives the command for controlling the activation of the secondary carrier.

In another embodiment of the present invention, the controlling module 502 is further configured to update, after preset delay time, the channel transmission status corresponding to the secondary carrier to a status same as a status of a corresponding user equipment channel transmission status before the secondary carrier is activated.

Figure 6:
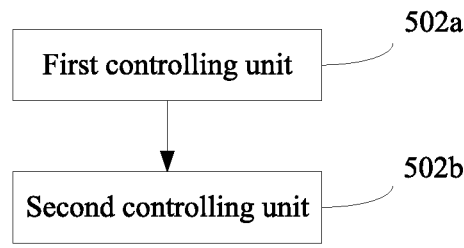
FIG. 6 is a schematic structural diagram of a controlling module according to another embodiment of the present invention.

Specifically, referring to FIG. 6, the controlling module 502 specifically includes a first controlling unit 502*a*, or, a second controlling unit 502*b*.

The first controlling unit 502*a* is configured to set an independent user equipment discontinuous transmission and discontinuous reception enabled variable UE_DTX_DRX_Enabled for a primary carrier and the secondary carrier separately, set, within the preset delay time after the secondary carrier is activated, a status of UE_DTX_DRX_Enabled corresponding to the secondary carrier to a deactivated status, and set the channel transmission status corresponding to the secondary carrier according to the status of UE_DTX_DRX_Enabled corresponding to the secondary carrier.

The second controlling unit 502*b* is configured to set an independent uplink discontinuous transmission activated variable UL_DTX_Active for a primary carrier and the secondary carrier separately, set, within the preset delay time after the secondary carrier is activated, a status of UL_DTX_Active corresponding to the secondary carrier to a deactivated status, and set the channel transmission status corresponding to the secondary carrier according to the status of UL_DTX_Active corresponding to the secondary carrier.

In another embodiment of the present invention, the first controlling unit 502a is further configured to update, after the preset delay time, the status of UE_DTX_DRX_Enabled corresponding to the secondary carrier to a status same as a status of UE_DTX_DRX_Enabled currently corresponding to the primary carrier, and update the channel transmission status corresponding to the secondary carrier according to an updated status of UE_DTX_DRX_Enabled corresponding to the secondary carrier.

The second controlling unit 502b is further configured to update, after the preset delay time, the status of UL_DTX_Active corresponding to the secondary carrier to a status same as a status of UL_DTX_Active currently corresponding to the primary carrier, and update the channel transmission status corresponding to the secondary carrier according to an updated status of UL_DTX_Active corresponding to the secondary carrier.

Figure 7:
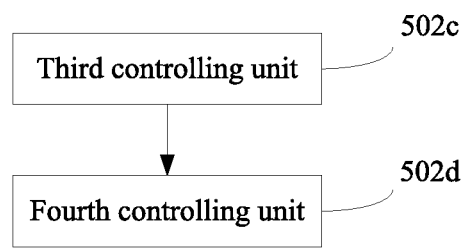
FIG. 7 is a schematic structural diagram of another controlling module according to another embodiment of the present invention.

Referring to FIG. 7, in another embodiment of the present invention, the controlling module 502 specifically includes a third controlling unit 502c or a fourth controlling unit 502d.

The third controlling unit 502c is configured to set a common user equipment discontinuous transmission and discontinuous reception enabled variable UE_DTX_DRX_Enabled for a primary carrier and the secondary carrier, set, within the preset delay time after the secondary carrier is activated, a status of the common UE_DTX_DRX_Enabled to a deactivated status, and set the channel transmission status corresponding to the secondary carrier according to the status of the common UE_DTX_DRX_Enabled.

The fourth controlling unit 502d is configured to set a common uplink discontinuous transmission activated variable UL_DTX_Active for a primary carrier and the secondary carrier, set, within the preset delay time after the secondary carrier is activated, a status of the common UL_DTX_Active to a deactivated status, and set the channel transmission status corresponding to the secondary carrier according to the status of the common UL_DTX_Active.

In another embodiment of the present invention, the third controlling unit 502c is further configured to update, after the preset delay time, the status of the common UE_DTX_DRX_Enabled to a status same as a status of corresponding UE_DTX_DRX_Enabled before the secondary carrier is activated, and update the channel transmission status corresponding to the secondary carrier according to an updated status of the common UE_DTX_DRX_Enabled.

The fourth controlling unit 502d is further configured to update, after the preset delay time, the status of the common UL_DTX_Active to a status same as a status of corresponding UL_DTX_Active before the secondary carrier is activated, and update the channel transmission status corresponding to the secondary carrier according to an updated status of the common UL_DTX_Active.

Figure 8:
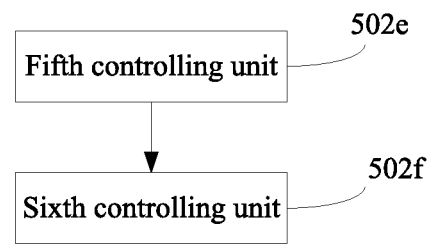
FIG. 8 is a schematic structural diagram of another controlling module according to another embodiment of the present invention.

In another embodiment of the present invention, referring to FIG. 8, the controlling module 502 specifically includes a fifth controlling unit 502e or a sixth controlling unit 502f.

The fifth controlling unit 502e is configured to set a common user equipment discontinuous transmission and discontinuous reception enabled variable UE_DTX_DRX_Enabled and/or an uplink discontinuous transmission activated variable UL_DTX_Active for a primary carrier and the secondary carrier.

The sixth controlling unit 502f is configured to set, within the preset delay time after the secondary carrier is activated, the channel transmission status corresponding to the secondary carrier to the continuous transmission status, where a status of the common UE_DTX_DRX_Enabled and/or UL_DTX_Active, where the common UE_DTX_DRX_Enabled and/or UL_DTX_Active is set by the fifth controlling unit 502e, is irrelevant to the channel transmission status which corresponds to the secondary carrier and is set by the sixth controlling unit 502f.

In another embodiment of the present invention, the sixth controlling unit 502f is further configured to update, after the preset delay time, the channel transmission status corresponding to the secondary carrier according to the status of the common UE_DTX_DRX_Enabled and/or UL_DTX_Active, where the common UE_DTX_DRX_Enabled and/or UL_DTX_Active is set by the fifth controlling unit 502e.

It should be noted that, the apparatus provided in each embodiment of the present invention may be a user equipment in a multi-carrier system such as HSPA, WCDMA, and LTE, for example, a terminal such as a personal computer or a mobile phone.

By using the apparatus provided in the embodiment, the command for controlling the activation of the secondary carrier is received, and the channel transmission status corresponding to the secondary carrier is set, within the preset delay time after the secondary carrier is activated, to the continuous transmission status, so that when detection of receiving quality is performed within the preset delay time, a speed and a success rate of synchronization when the secondary carrier is activated can be increased, and reliability of an initial channel synchronization process when the secondary carrier is activated is ensured.

It should be noted that, when the apparatus for controlling a channel transmission status according to the foregoing embodiment controls the channel transmission status, only dividing of the foregoing functional modules is used as an example for description. In actual applications, the foregoing functions may be allocated to different functional modules for implementation according to requirements, that is, an internal structure of the apparatus is divided into different functional modules for implementing all or part of the functions described above. In addition, the apparatus for controlling a channel transmission status provided in the foregoing embodiments and the embodiments of the method for controlling a channel transmission status are based on the same conception. For the specific implementation process, reference may be made to the method embodiments, and details are not repeatedly described here.

In the several embodiments provided in this application, it should be understood that the disclosed system, apparatus, and method may be implemented in other manners. For example, the foregoing apparatus embodiments are illustrative only. For example, the dividing of units is only a kind of logical function dividing. In actual implementation, there may be other dividing manners, for example, multiple units or components may be combined or integrated into another system, or some features may be ignored or not be executed. In addition, the shown or discussed mutual coupling or direct coupling or communication connection may be implemented through some interfaces, and indirect coupling or communication connection between the apparatuses or units may be electrical, mechanical or in other forms.

The units that are described as separate parts may be or may not be separated physically. The parts that are displayed as units may be or may not be physical units, that is, may be located at one place, or may also be distributed on multiple network units. The purpose of the technical solutions of the embodiments may be achieved through all or part of the units selected according to actual needs.

In addition, all functional units in the embodiments of the present invention may be integrated into a processing unit, the units may also exist separately and physically, and two or more than two of the units may also be integrated into one unit. The foregoing integrated unit not only may be implemented by adopting a form of hardware, but also may be implemented by adopting a form of a software function unit.

If the integrated unit is implemented in the form of a software function unit and sold or used as an independent product, it may be stored in a computer readable storage medium. Based on such understanding, the essence of the technical solutions of the present invention or parts that make contributions to the prior art or all or part of the technical solution may be embodied in a form of a software product. The software product is stored in a storage medium, and includes several instructions used for enabling a computer device (for example, a personal computer, a server, or a network device) to execute all or part of the steps of the methods provided in the embodiments of the present invention. The preceding storage medium may be any medium that is capable of storing program codes, such as a USB disk, a removable hard disk, a read-only memory (ROM, Read-Only Memory), a random access memory (RAM, Random Access Memory), a magnetic disk, or an optical disk.

The foregoing embodiments are merely provided for describing the technical solutions of the present invention, but not intended to limit the present invention. Although the present invention is described in detail with reference to the foregoing embodiments, persons of ordinary skill in the art should understand that they may still make modifications to the technical solutions recorded in the foregoing embodiments, or equivalent replacements to parts of the technical features; however, these modifications or replacements do not make the essence of the corresponding technical solutions depart from the scope of the technical solutions of the embodiments of the present invention.

What is claimed is:

1. A method for controlling a channel transmission status, the method comprising:
   receiving a command for controlling activation of a secondary carrier; and
   setting a channel transmission status corresponding to the secondary carrier to a continuous transmission status within a preset delay time after the secondary carrier is activated, wherein setting the channel transmission status comprises:
   setting at least one of a common user equipment discontinuous transmission and discontinuous reception enabled variable (UE_DTX_DRX_Enabled) and a common uplink discontinuous transmission activated variable (UL_DTX_Active) for a primary carrier and the secondary carrier; and
   setting, within the preset delay time after the secondary carrier is activated, the channel transmission status corresponding to the secondary carrier to the continuous transmission status, wherein at least one of a status of the common UE_DTX_DRX_Enabled and a status of UL_DTX_Active is irrelevant to the channel transmission status corresponding to the secondary carrier.

2. The method according to claim 1, further comprising updating, after the preset delay time, the channel transmission status corresponding to the secondary carrier to a status that is the same as a corresponding user equipment channel transmission status before the secondary carrier is activated.

3. The method according to claim 1, wherein setting, the channel transmission status comprises:
   setting an independent user equipment discontinuous transmission and discontinuous reception enabled variable (UE_DTX_DRX_Enabled) for a primary carrier and the secondary carrier separately;
   setting, within the preset delay time after the secondary carrier is activated, a status of UE_DTX_DRX_Enabled corresponding to the secondary carrier to a deactivated status; and
   setting the channel transmission status corresponding to the secondary carrier according to the status of UE_DTX_DRX_Enabled corresponding to the secondary carrier.

4. The method according to claim 3, further comprising:
   updating, after the preset delay time, the status of UE_DTX_DRX_Enabled corresponding to the secondary carrier to a status that is the same as a status of UE_DTX_DRX_Enabled currently corresponding to the primary carrier; and
   updating the channel transmission status corresponding to the secondary carrier according to an updated status of UE_DTX_DRX_Enable corresponding to the secondary carrier.

5. The method according to claim 1, wherein setting, the channel transmission status comprises:
   setting an independent uplink discontinuous transmission activated variable (UL_DTX_Active) for a primary carrier and the secondary carrier separately;
   setting, within the preset delay time after the secondary carrier is activated, a status of UL_DTX_Active corresponding to the secondary carrier to a deactivated status; and
   setting the channel transmission status corresponding to the secondary carrier according to the status of UL_DTX_Active corresponding to the secondary carrier.

6. The method according to claim 5, further comprising:
   updating, after the preset delay time, the status of UL_DTX_Active corresponding to the secondary carrier to a status same as a status of UL_DTX_Active currently corresponding to the primary carrier; and
   updating the channel transmission status corresponding to the secondary carrier according to an updated status of UL_DTX_Active corresponding to the secondary carrier.

7. The method according to claim 1, wherein setting, the channel transmission status comprises:
   setting a common user equipment discontinuous transmission and discontinuous reception enabled variable (UE_DTX_DRX_Enabled) for a primary carrier and the secondary carrier;
   setting, within the preset delay time after the secondary carrier is activated, a status of the common UE_DTX_DRX_Enabled to a deactivated status; and
   setting the channel transmission status corresponding to the secondary carrier according to the status of the common UE_DTX_DRX_Enabled.

8. The method according to claim 7, further comprising:
   updating, after the preset delay time, the status of the common UE_DTX_DRX_Enabled to a status same as a status of corresponding UE_DTX_DRX_Enabled before the secondary carrier is activated; and
   updating the channel transmission status corresponding to the secondary carrier according to an updated status of the common UE_DTX_DRX_Enable.

9. The method according to claim 1, wherein setting, after the channel transmission status comprises:
  setting a common uplink discontinuous transmission activated variable (UL_DTX_Active) for a primary carrier and the secondary carrier;
  setting, within the preset delay time after the secondary carrier is activated, a status of the common UL_DTX_Active to a deactivated status; and
  setting the channel transmission status corresponding to the secondary carrier according to the status of the common UL_DTX_Active.

10. The method according to claim 9, further comprising:
  updating, after the preset delay time, the status of the common UL_DTX_Active to a status same as a status of corresponding UL_DTX_Active before the secondary carrier is activated; and
  updating the channel transmission status corresponding to the secondary carrier according to an updated status of the common UL_DTX_Active.

11. The method according to claim 1, further comprising:
  updating, after the preset delay time, the channel transmission status corresponding to the secondary carrier according to at least one of the status of the common UE_DTX_DRX_Enabled and the status of the status of the UL_DTX_Active.

12. The method according to claim 1, wherein a value of the preset delay time is equal to one of a value of an enabling delay parameter in a discontinuous transmission and discontinuous reception parameter, a value of an enabling delay parameter separately set by a network side for the secondary carrier, and a preset fixed delay value.

13. An apparatus for controlling a channel transmission status, comprising:
  a receiver, configured to receive a command for controlling activation of a secondary carrier; and
  a processor, configured to set, within a preset delay time after the secondary carrier is activated, a channel transmission status corresponding to the secondary carrier to a continuous transmission status after the receiver receives the command for controlling the activation of the secondary carrier, wherein the processor is configured to set at least one of a common user equipment discontinuous transmission and discontinuous reception enabled variable (UE_DTX_DRX_Enabled) and an uplink discontinuous transmission activated variable (UL_DTX_Active) for a primary carrier and the secondary carrier, and configured to set, within the preset delay time after the secondary carrier is activated, the channel transmission status corresponding to the secondary carrier to the continuous transmission status, wherein at least one of a status of the common UE_DTX_DRX_Enabled and a status of the UL_DTX_Active is irrelevant to the channel transmission status which corresponds to the secondary carrier.

14. The apparatus according to claim 13, wherein the processor is further configured to update, after the preset delay time, the channel transmission status corresponding to the secondary carrier to a status same as a corresponding user equipment channel transmission status before the secondary carrier is activated.

15. The apparatus according to claim 13, wherein,
  the processor is configured to set an independent user equipment discontinuous transmission and discontinuous reception enabled variable (UE_DTX_DRX_Enabled) for a primary carrier and the secondary carrier separately, to set, within the preset delay time after the secondary carrier is activated, a status of UE_DTX_DRX_Enabled corresponding to the secondary carrier to a deactivated status, and to set the channel transmission status corresponding to the secondary carrier according to the status of UE_DTX_DRX_Enabled corresponding to the secondary carrier.

16. The apparatus according to claim 15, wherein the processor is further configured to update, after the preset delay time, the status of UE_DTX_DRX_Enabled corresponding to the secondary carrier to a status same as a status of UE_DTX_DRX_Enabled currently corresponding to the primary carrier, and to update the channel transmission status corresponding to the secondary carrier according to an updated status of UE_DTX_DRX_Enable corresponding to the secondary carrier.

17. The apparatus according to claim 13, wherein the processor is configured to set an independent uplink discontinuous transmission activated variable (UL_DTX_Active) for a primary carrier and the secondary carrier separately, to set, within the preset delay time after the secondary carrier is activated, a status of UL_DTX_Active corresponding to the secondary carrier to a deactivated status, and to set the channel transmission status corresponding to the secondary carrier according to the status of UL_DTX_Active corresponding to the secondary carrier.

18. The apparatus according to claim 17, wherein the processor is further configured to update, after the preset delay time, the status of UL_DTX_Active corresponding to the secondary carrier to a status same as a status of UL_DTX_Active currently corresponding to the primary carrier, and update the channel transmission status corresponding to the secondary carrier according to an updated status of UL_DTX_Active corresponding to the secondary carrier.

19. The apparatus according to claim 13, wherein
  the processor is configured to set a common user equipment discontinuous transmission and discontinuous reception enabled variable (UE_DTX_DRX_Enabled) for a primary carrier and the secondary carrier, to set, within the preset delay time after the secondary carrier is activated, a status of the common UE_DTX_DRX_Enabled to a deactivated status, and to set the channel transmission status corresponding to the secondary carrier according to the status of the common UE_DTX_DRX_Enabled.

20. The apparatus according to claim 19, wherein the processor is further configured to update, after the preset delay time, the status of the common UE_DTX_DRX_Enabled to a status same as a status of corresponding UE_DTX_DRX_Enabled before the secondary carrier is activated, and update the channel transmission status corresponding to the secondary carrier according to an updated status of the common UE_DTX_DRX_Enable.

21. The apparatus according to claim 13, wherein the processor is configured to set a common uplink discontinuous transmission activated variable UL_DTX_Active for a primary carrier and the secondary carrier, to set, within the preset delay time after the secondary carrier is activated, a status of the common UL_DTX_Active to a deactivated status, and to set the channel transmission status corresponding to the secondary carrier according to the status of the common UL_DTX_Active.

22. The apparatus according to claim 21, wherein the processor is further configured to update, after the preset delay time, the status of the common UL_DTX_Active to a status same as a status of corresponding UL_DTX_Active before the secondary carrier is activated, and update the channel transmission status corresponding to the secondary carrier according to an updated status of the common UL_DTX_Active.

23. The apparatus according to claim 13, wherein the processor is further configured to update, after the preset delay time, the channel transmission status corresponding to the secondary carrier according to at least one of the status of the common UE_DTX_DRX_Enabled and the status of the UL_DTX_Active.

* * * * *